(12) United States Patent
Hara et al.

(10) Patent No.: US 7,660,066 B2
(45) Date of Patent: Feb. 9, 2010

(54) STORAGE DEVICE, HEAD RETURNING METHOD, AND HEAD RETURNING APPARATUS

(75) Inventors: Takeshi Hara, Kawasaki (JP); Takahiro Aoki, Kawasaki (JP); Shigenori Yanagi, Kawasaki (JP)

(73) Assignee: Toshiba Storage Device Corporation, Tokyo (JP)

( * ) Notice: Subject to any disclaimer, the term of this patent is extended or adjusted under 35 U.S.C. 154(b) by 345 days.

(21) Appl. No.: 11/589,402

(22) Filed: Oct. 30, 2006

(65) Prior Publication Data
US 2007/0291398 A1    Dec. 20, 2007

(30) Foreign Application Priority Data
Jun. 15, 2006    (JP) .............................. 2006-166609

(51) Int. Cl.
*G11B 21/02* (2006.01)
(52) U.S. Cl. ........................................................ 360/75
(58) Field of Classification Search .................... 360/75, 360/60, 69
See application file for complete search history.

(56) References Cited

U.S. PATENT DOCUMENTS

| | | | | |
|---|---|---|---|---|
| 6,967,804 B1 * | 11/2005 | Codilian | ...................... | 360/75 |
| 7,190,540 B2 * | 3/2007 | Matsumoto | .................. | 360/60 |
| 7,253,982 B1 * | 8/2007 | Brunnett et al. | ............... | 360/60 |
| 7,301,723 B2 * | 11/2007 | Matsumoto | .................. | 360/75 |
| 7,356,437 B2 * | 4/2008 | Kobayashi et al. | .......... | 702/127 |
| 7,428,119 B2 * | 9/2008 | Kuroki et al. | ................. | 360/75 |
| 7,450,332 B2 * | 11/2008 | Pasolini et al. | ................ | 360/75 |
| 2007/0159710 A1 * | 7/2007 | Lucas et al. | ................... | 360/75 |

FOREIGN PATENT DOCUMENTS

| | | |
|---|---|---|
| JP | 2002-208239 | 7/2002 |
| JP | 2004-199743 | 7/2004 |

* cited by examiner

*Primary Examiner*—Fred Tzeng
(74) *Attorney, Agent, or Firm*—Greer, Burns & Crain, Ltd.

(57) ABSTRACT

A time measuring unit measures a duration time of a state relating to the detection of the abnormality when the head is retracted. A head-return determining unit determines whether to return the head onto the storage medium based on the measured duration time.

19 Claims, 7 Drawing Sheets

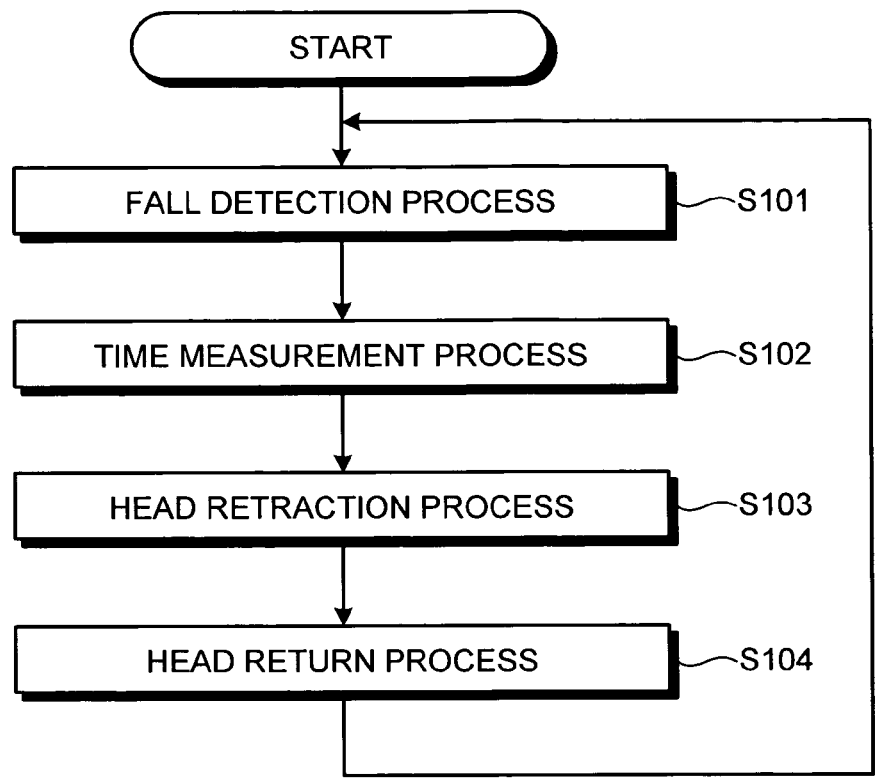
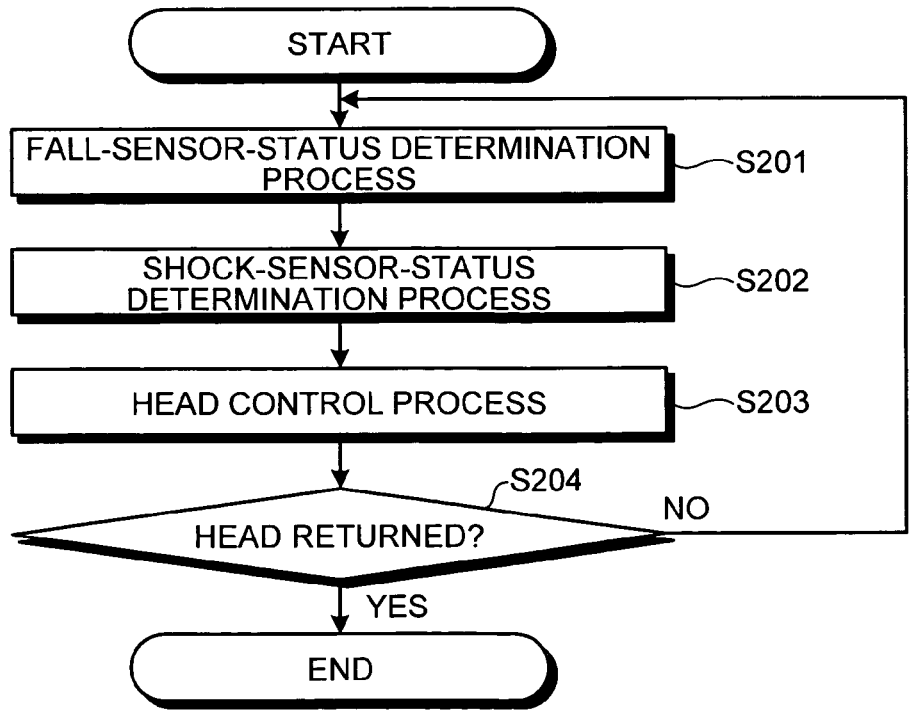

FIG.8

|  | SHOCK-SENSOR-STATUS DETERMINATION PROCESS | | |
|---|---|---|---|
|  | DETERMINED TO BE ABNORMAL | DETERMINED TO CONTINUE RETRACTION | DETERMINED TO ALLOW RETURN |
| FALL-SENSOR-STATUS DETERMINATION PROCESS — DETERMINED TO BE ABNORMAL | RETURN FORCIBLY | PRESS AGAINST RAMP (APPLY CLAMP CURRENT) | RETURN FORCIBLY |
| FALL-SENSOR-STATUS DETERMINATION PROCESS — DETERMINED TO CONTINUE RETRACTION | CONTINUE RETRACTION | PRESS AGAINST RAMP (APPLY CLAMP CURRENT) | CONTINUE RETRACTION |
| FALL-SENSOR-STATUS DETERMINATION PROCESS — DETERMINED TO ALLOW RETURN | RETURN FORCIBLY | PRESS AGAINST RAMP (APPLY CLAMP CURRENT) | RETURN |

STORAGE DEVICE, HEAD RETURNING METHOD, AND HEAD RETURNING APPARATUS

BACKGROUND OF THE INVENTION

1. Field of the Invention

The present invention relates to a storage device, a head returning method, and a head returning apparatus, and, more specifically to a storage device, a head returning method, and a head returning apparatus that can return a head safely, when the head is retracted.

2. Description of the Related Art

A magnetic disk drive such as a hard disk drive (HDD) is used mainly as an auxiliary storage of a computer, and used for a dedicated device for business use, which requires a large capacity of random access recording. In recent years, with the digitalization of household appliances, there is a new application of recording audio and image data as digital data, and use thereof in general household products is increasing (for example, a hard disk video recorder, a portable music player, and the like).

When the magnetic disk drive has a strong shock such as a fall, the head can collide on a disk surface to damage the disk, and read and write of data may not be possible. Particularly, since a fall during an operation of the magnetic disk drive is likely to cause a failure, when handling a product having a magnetic disk drive built therein for portable use, it is necessary to take care so as not to cause a strong impact thereon.

To cover such a defect, there is a technique for automatically retracting the head of the hard disk drive when a sensor provided therein detects a fall (see Japanese Patent Application Laid-open No. 2002-208239).

When the head is retracted by such a technique, the head needs to be returned after appropriately determining that the hard disk drive is not in a falling state any more. However, if the head is simply returned after a predetermined time has passed since the head is retracted, the head can collide on the disk surface in a state that, for example, the hard disk drive is rolling.

Therefore, there is another technique that after a head is retracted, when a sensor detects that acceleration applied to a hard disk drive becomes zero, the head is returned (see, for example, Japanese Patent Application Laid-open No. 2004-199743). According to this technique, when the head is retracted during disk access, the contents of the disk access failed due to retraction of the head are stored, and the disk access is resumed after returning the head.

However, as in the above conventional technique in the method of returning the head when the sensor detects that acceleration applied to the hard disk drive becomes zero, if the way of falling of the magnetic disk drive is complicated, there is a possibility that the head is returned even the magnetic disk drive is still rolling.

Specifically, after the magnetic disk drive falls from a desk, when the magnetic disk drive collides on a chair and falls again, and finally collides on the floor, the acceleration of the magnetic disk drive changes in a complicated manner, and the acceleration can become zero momentarily, during the fall. In this case, if the head is returned during the fall, it can collide on the disk surface due to the impact applied to the magnetic disk drive thereafter.

SUMMARY OF THE INVENTION

It is an object of the present invention to at least partially solve the problems in the conventional technology.

A storage device according to one aspect of the present invention returns a head, which is retracted from a storage medium with a detection of an abnormality, onto the storage medium. The storage device includes a time measuring unit that measures a duration time of a state relating to the detection of the abnormality when the head is retracted; and a head-return determining unit that determines whether to return the head onto the storage medium based on the measured duration time.

A method according to another aspect of the present invention is for returning a head, which is retracted from a storage medium with a detection of an abnormality, onto the storage medium. The method includes measuring a duration time of a state relating to the detection of the abnormality when the head is retracted; and determining whether to return the head onto the storage medium based on the measured duration time.

A computer program product according to still another aspect of the present invention includes a computer usable medium having computer readable program codes embodied in the medium that when executed cause a computer to execute measuring a duration time of a state relating to the detection of the abnormality when the head is retracted; and determining whether to return the head onto the storage medium based on the measured duration time.

An apparatus according to still another aspect of the present invention is for returning a head, which is retracted from a storage medium with a detection of an abnormality, onto the storage medium. The apparatus includes a time measuring unit that measures a duration time of a state relating to the detection of the abnormality when the head is retracted; and a head-return determining unit that determines whether to return the head onto the storage medium based on the measured duration time.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a flowchart of a processing procedure for a retraction and return process of a head according to the present embodiment;

FIG. 4 is a flowchart of a processing procedure for a head return process shown in FIG. 3;

FIG. 8 is a table of process contents in the head control process.

DETAILED DESCRIPTION OF THE PREFERRED EMBODIMENTS

Exemplary embodiments of the present invention will be explained below in detail with reference to the accompanying drawings.

Figure 1:
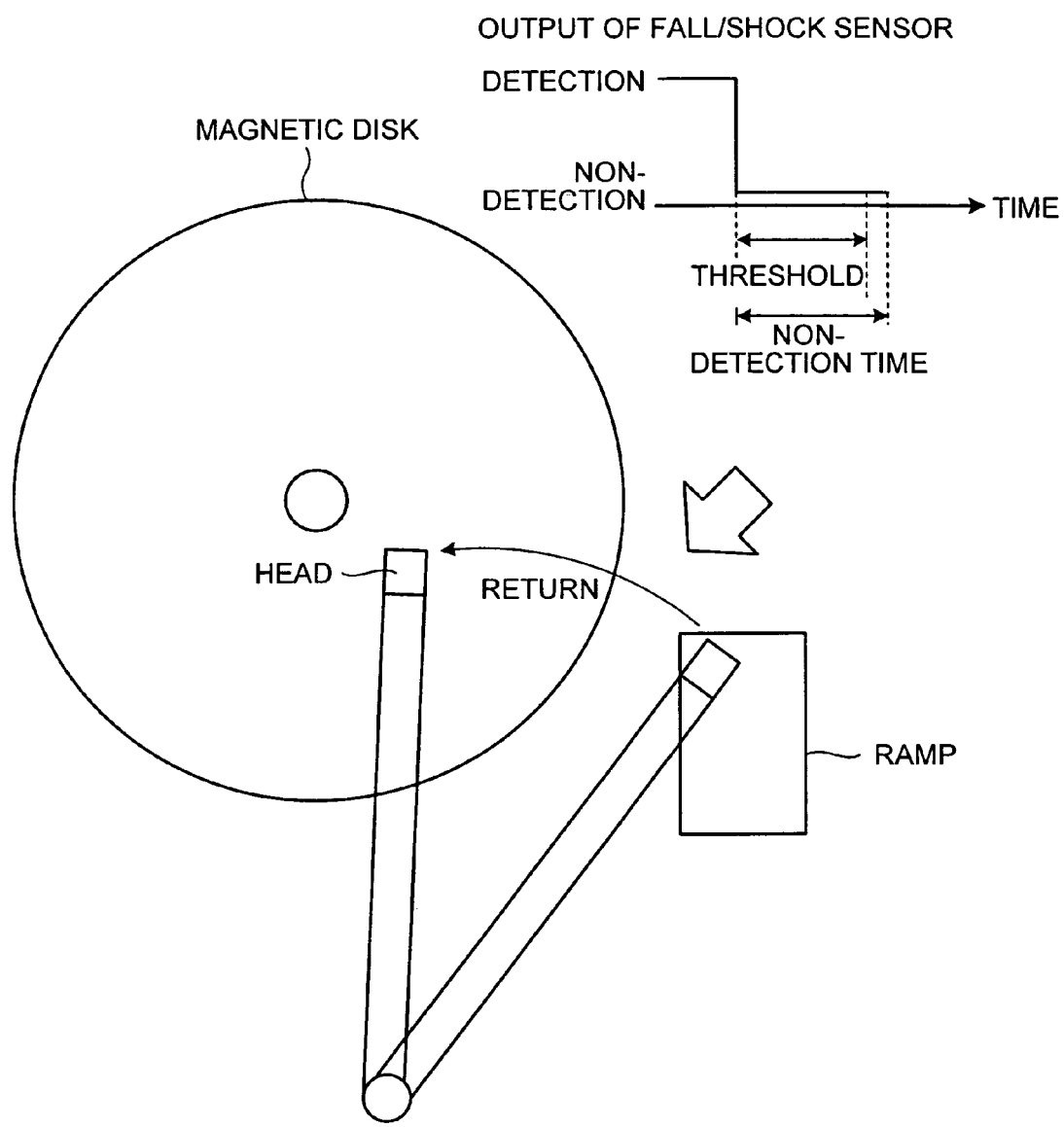
FIG. 1 is a schematic diagram for explaining an outline and features of a magnetic disk drive according to an embodiment of the present invention.

An outline and features of a magnetic disk drive 100 according to an embodiment of the present invention are explained first. FIG. 1 is a schematic diagram for explaining the outline and the features of the magnetic disk drive 100. As shown in FIG. 1, when a head is retracted to a ramp, the magnetic disk drive 100 measures an elapsed time (a non-detection time) since a fall sensor or a shock sensor detected a last fall or shock, and then returns the head onto the disk surface when the elapsed time becomes longer than a predetermined threshold.

Thus, by returning the head after a sufficient time has passed since the detection of the last fall or shock, the head can be returned safely, even when the way of falling of the magnetic disk drive 100 is complicated such that the magnetic disk drive 100 fallen from a desk collides on a chair and falls again, and collides on the floor.

Figure 2:
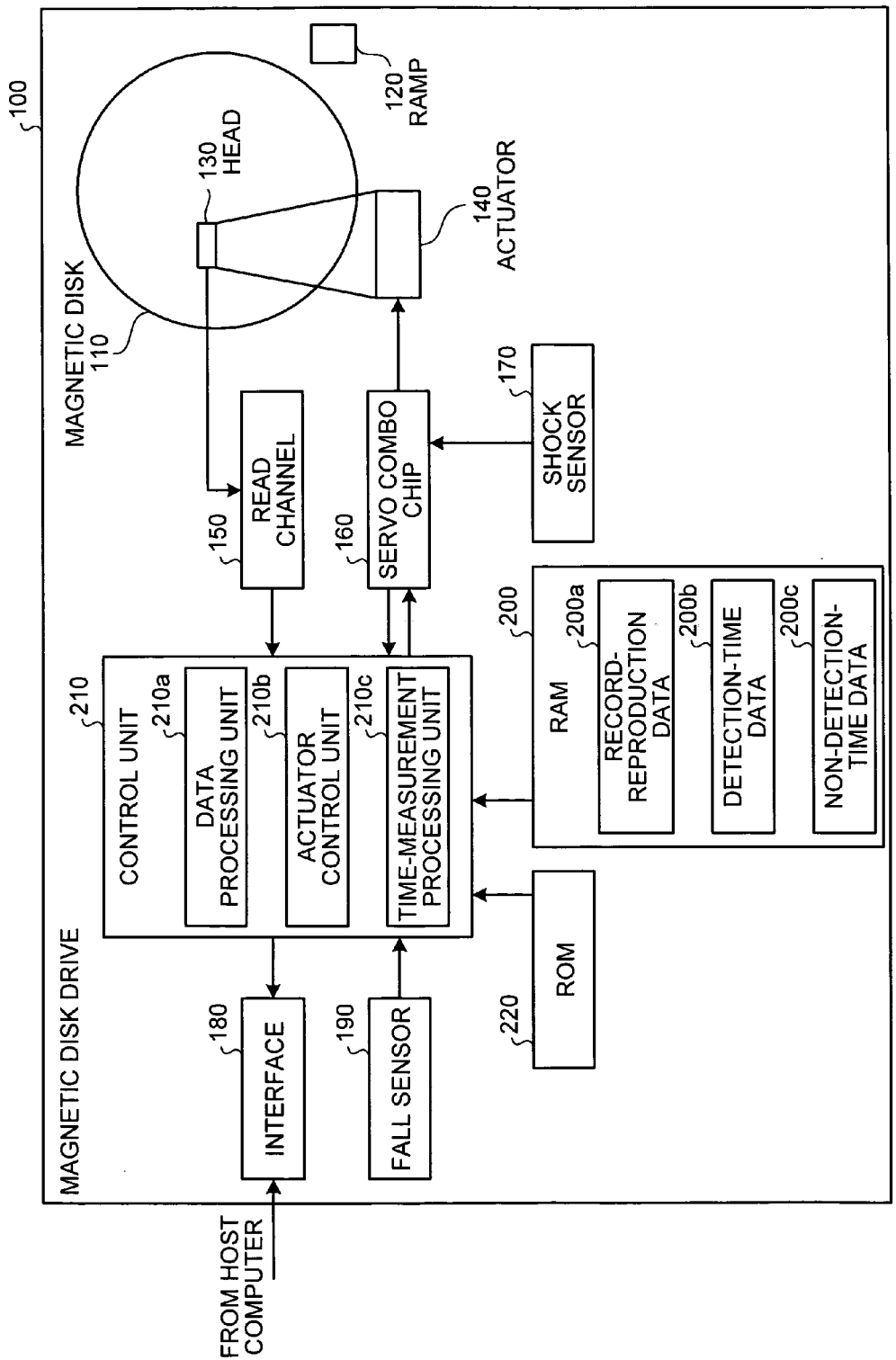
FIG. 2 is a functional block diagram of the configuration of the magnetic disk drive according to the present embodiment.

FIG. 2 is a functional block diagram of the configuration of the magnetic disk drive 100 according to the present embodiment. The magnetic disk drive 100 includes a magnetic disk 110, a ramp 120, a head 130, an actuator 140, a read channel 150, a servo combo chip 160, a shock sensor 170, an interface 180, a fall sensor 190, a random access memory (RAM) 200, a control unit 210, and a read only memory (ROM) 220. Other configurations are the same as that of a general magnetic disk drive according to a load/unload method, and therefore explanation thereof is omitted.

The magnetic disk 110 is a recording medium in which a magnetic film is formed on a disc-shaped substrate made of metal or glass. When data is recorded on the magnetic disk 110, a magnetic field from the head 130 is irradiated to a recording area of the magnetic disk 110 for recording data, to change a magnetized state of the magnetic film of the magnetic disk 110, thereby recording the data. When the data is reproduced from the magnetic disk 110, the head 130 is moved to the recording area on the magnetic disk 110 to be reproduced, to read the magnetized state of the magnetic film of the magnetic disk 110, thereby reproducing the data.

A fixed cylinder (or an unload cylinder) is set on the magnetic disk 110. When the magnetic disk drive 100 is to retract the head 130 to the ramp 120, after the head 130 is once moved to the fixed cylinder set on the magnetic disk 110, the head 130 is then retracted to the ramp 120. A distance between the fixed cylinder set on the magnetic disk 110 and the ramp 120 is kept constant. The ramp 120 is a stopper to stop the head 130 at the time of retraction of the head.

The head 130 records and reproduces data with respect to the magnetic disk 110. The head 130 reads a servo signal for controlling a track position and the like from the magnetic disk 110, and outputs the servo signal together with reproduced data reproduced from the magnetic disk 110 to the read channel 150.

The actuator 140 includes a voice coil motor (VCM), and moves the head 130 by control current output from the servo combo chip 160. The read channel 150 obtains the reproduced data and the serve signal from the head 130, and outputs the obtained reproduced data and servo signal to the control unit 210.

The servo combo chip 160 outputs the control current to the actuator 140 according to a command from the control unit 210, to control the movement of the head 130. The servo combo chip 160 outputs the control current to a spindle motor (not shown), to control the rotation of the magnetic disk 110.

The shock sensor 170 detects a shock applied to the magnetic disk drive 100. The shock sensor 170 outputs information relating to the detected shock to the control unit 210 via the servo combo chip 160.

The interface 180 controls communication between the magnetic disk drive 100 and a host computer (not shown). The fall sensor 190 detects a free fall of the magnetic disk drive 100 in all directions of three axes (X-Y-Z), and outputs fall information indicating whether the magnetic disk drive 100 is falling to the control unit 210.

The RAM 200 stores data required for various types of processing by the control unit 210, and particularly as data closely related to the present invention, stores record/reproduction data 200a, detection-time data 200b, and non-detection-time data 200c.

Among these data, the record/reproduction data 200a indicates data obtained from the host computer, which is to be stored in the magnetic disk 110, or data reproduced from the magnetic disk 110. In the magnetic disk drive 100, data to be recorded in the magnetic disk 110 and data to be read from the magnetic disk 110 are once stored in the RAM 200.

The detection-time data 200b stores a time since a fall or shock has been detected until the fall or shock is not detected any more, when the shock sensor 170 or the fall sensor 190 has detected the fall or shock.

The non-detection-time data 200c stores an elapsed time since last detection of a fall or shock after the shock sensor 170 or the fall sensor 190 has detected the fall or shock.

The control unit 210 executes various types of processing by a program specifying various process procedures and control data recorded in the ROM 220. Particularly as data closely related to the present invention, the control unit 210 in the present embodiment includes a data processing unit 210a, an actuator control unit 210b, and a time-measurement processing unit 210c.

The data processing unit 210a records data obtained from the host computer in the record/reproduction data 200a, and obtains data (such as data reproduced from the magnetic disk 110) from the record/reproduction data in response to a request from the host computer to output the data to the host computer.

The actuator control unit 210b outputs a control command to the servo combo chip 160 at the time of recording or reproducing data with respect to the magnetic disk 110, or at the time of retracting or returning the head 130, thereby moving the head 130 to a predetermined position.

Particularly, when the head 130 is retracted to the ramp 120, the actuator control unit 210b obtains the information of an elapsed time since the last detection of a shock or fall by the shock sensor 170 or the fall sensor 190 from the non-detection-time data 200c, and returns the head 130 onto the surface of the magnetic disk 110 when the elapsed time becomes longer than a predetermined threshold.

The actuator control unit 210b further obtains information of a time while the shock sensor 170 or the fall sensor 190 is detecting a shock or fall from the detection-time data 200b, and when the shock or fall has been detected for a predetermined time or more, the actuator control unit 210b determines that some abnormality has occurred in the shock sensor 170 or the fall sensor 190, and forcibly returns the head 130.

Further, the actuator control unit 210b obtains information of the elapsed time since the last detection of a shock by the shock sensor 170 from the non-detection-time data 200c, and when the elapsed time is shorter than a predetermined threshold, the actuator control unit 210b presses the head 130 against the ramp 120 so that the head 130 does not move due to a shock that can occur later.

Specifically, the actuator control unit 210b controls the servo combo chip 160 to supply clamp current to the actuator 140, and press the head 130 against the ramp 120.

After a falling state is detected by the fall sensor 190 and when the time while the fall sensor 190 is detecting the fall is shorter than a predetermined threshold, the actuator control unit 210b does not allow return of the head 130, to continue retraction of the head to the ramp 120, preparing for a shock that can occur later.

The time-measurement processing unit 210c measures an elapsed time since the first detection of a shock or fall until no shock or fall is detected, when the shock sensor 170 or the fall sensor 190 has detected the shock or fall, and an elapsed time since the last detection of a shock or fall detected by the shock sensor 170 or the fall sensor 190, by an output from a clock (not shown). The time-measurement processing unit 210c allows the results of measuring the time to be stored in the RAM 200 as the detection-time data 200b and the non-detection-time data 200c.

FIG. 3 is a flowchart of a processing procedure for the retraction and return process of the head 130. The fall sensor 190 in the magnetic disk drive 100 executes a fall detection process for detecting a fall of the magnetic disk drive 100 (step S101).

Subsequently, the time-measurement processing unit 210c starts a time measurement process for respectively measuring an elapsed time, when a fall has been detected, since the first detection of the fall until the fall is not detected any more, and when a shock is detected after the fall has been detected, an elapsed time since the first detection of the shock until the shock is not detected any more, an elapsed time since the last detection of a fall, and an elapsed time since the last detection of a shock (step S102).

The actuator control unit 210b executes a head retraction process for retracting the head 130 from the surface of the magnetic disk 110 and moving the head 130 onto the ramp 120 (step S103).

Thereafter, the actuator control unit 210b executes a head return process for returning the head 130 retracted to the ramp 120 to the surface of the magnetic disk 110, based on the time measured by the time-measurement processing unit 210c (step S104), and proceeds to step S101 to continue the subsequent processes.

The head return process procedure shown in FIG. 3 is explained in detail. FIG. 4 is a flowchart of a processing procedure for the head return process shown in FIG. 3. As shown in FIG. 4, the actuator control unit 210b in the magnetic disk drive 100 executes a fall-sensor-status determination process for determining whether the fall sensor 190 is abnormal, whether to continue retraction of the head 130, and whether to allow return of the head 130, based on information of duration of a state in which the fall is being detected by the fall sensor 190 and the duration of the state in which the fall is not detected (step S201).

The actuator control unit 210b then executes a shock-sensor-status determination process for determining whether the shock sensor 170 is abnormal, whether to continue retraction of the head 130, and whether to allow return of the head 130, based on information of the duration of the state in which the shock is being detected by the shock sensor 170 and the duration of the state in which the shock is not detected (step S202).

Thereafter, the actuator control unit 210b determines whether to allow return of the head 130 based on the determination results obtained by the fall-sensor-status determination process and the shock-sensor-status determination process, controls the head 130 based on the determination result, to return the head 130 or continue retraction of the head 130 (step S203).

The actuator control unit 210b checks if a return process of the head 130 has been completed (step S204). When the return process has not yet been completed (step S204: No), the actuator control unit 210b proceeds to step S201 to continue the subsequent processes. When the return process has been completed (step S204: Yes), the actuator control unit 210b finishes the head return process.

Figure 5:
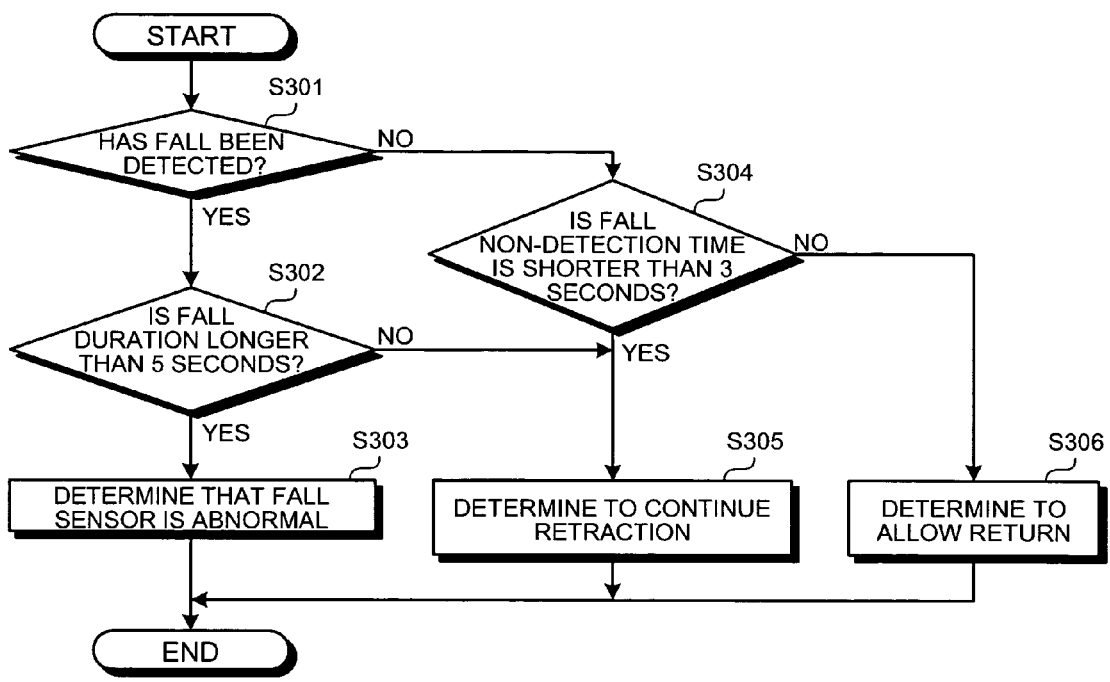
FIG. 5 is a flowchart of a processing procedure for a process of fall-sensor-status determination shown in FIG. 4.

A process procedure of the fall-sensor-status determination shown in FIG. 4 is explained in detail. FIG. 5 is a flowchart of a processing procedure for the process of the fall-sensor-status determination shown in FIG. 4. The actuator control unit 210b checks if the fall sensor 190 is in a state of detecting a fall (step S301).

When the fall sensor 190 is in the state of detecting a fall (step S301: Yes), the actuator control unit 210b checks if the duration while the fall sensor 190 is detecting the fall (a fall duration) is longer than 5 seconds (step S302). While the threshold to be compared with the duration is set to 5 seconds, the threshold can be set to another value.

When the duration is longer than 5 seconds (step S302: Yes), the actuator control unit 210b determines that the fall sensor 190 has an abnormal state (step S303), to finish the fall-sensor-status determination process.

When the duration is shorter than 5 seconds (step S302: No), the actuator control unit 210b determines that retraction of the head 130 should be continued (step S305), to finish the fall-sensor-status determination process.

At step S301, when the fall sensor 190 is not detecting a fall (step S301: No), the actuator control unit 210b checks if the elapsed time since the last detection of the fall by the fall sensor 190 (a fall non-detection time) is shorter than 3 seconds (step S304). While the threshold to be compared with the elapsed time is set to 3 seconds, this threshold can be set to another value.

When the elapsed time is shorter than 3 seconds (step S304: Yes), the actuator control unit 210b determines that retraction of the head 130 should be continued (step S305), to finish the fall-sensor-status determination process.

When the elapsed time is longer than 3 seconds (step S304: No), the actuator control unit 210b determines that the head 130 should be returned (step S306), to finish the fall-sensor-status determination process.

Figure 6:
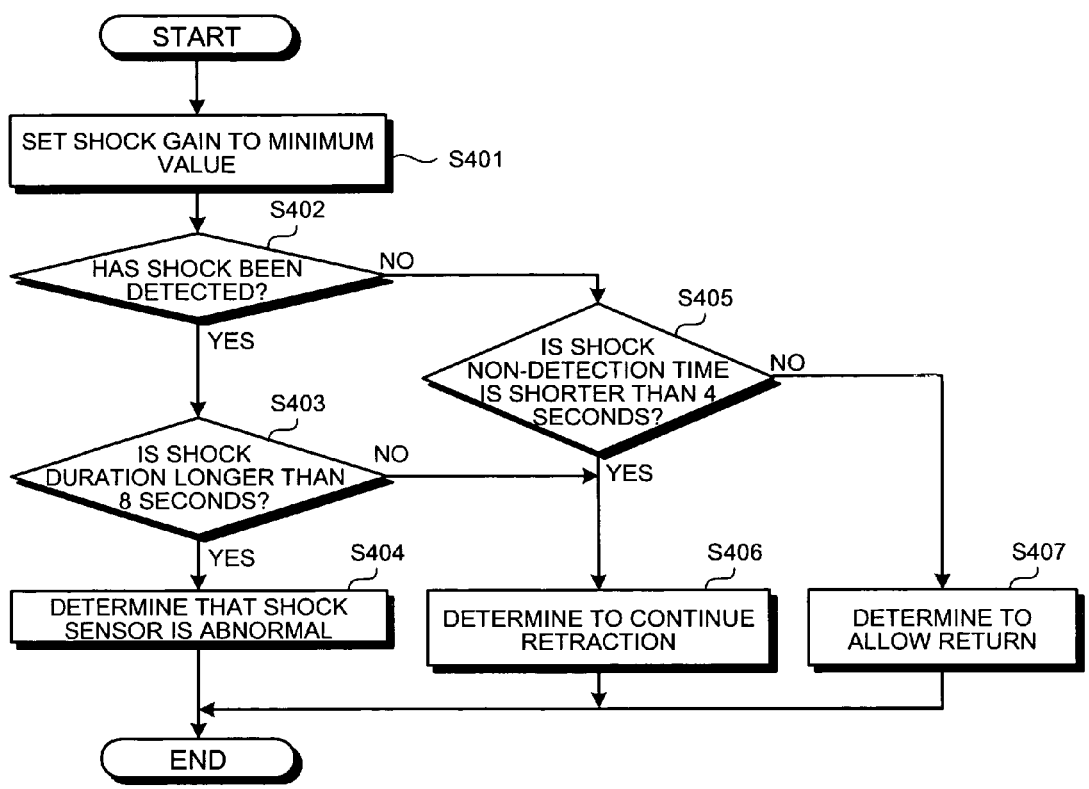
FIG. 6 is a flowchart of a processing procedure for a process of a shock-sensor-status determination shown in FIG. 4.

A process procedure of the shock-sensor-status determination shown in FIG. 4 is explained in detail. FIG. 6 is a flowchart of a processing procedure for the process of the shock-sensor-status determination shown in FIG. 4. As shown in FIG. 6, the actuator control unit 210b in the magnetic disk drive 100 sets a shock gain, when the shock sensor 170 detects a shock, to a minimum value to detect only a strong shock (step S401).

The actuator control unit 210b then checks whether the shock sensor 170 is detecting a shock (step S402). When the shock sensor 170 is detecting a shock (step S402: Yes), the actuator control unit 210b checks whether the duration while the shock sensor 170 is detecting the shock (a shock duration) is longer than 8 seconds (step S403). While the threshold to be compared with the duration is set to 8 seconds, this threshold can be set to another value.

When the duration is longer than 8 seconds (step S403: Yes), the actuator control unit 210b determines that abnormality has occurred in the shock sensor 170 (step S404), to finish the shock-sensor-status determination process.

When the duration is shorter than 8 seconds (step S403: No), the actuator control unit 210b determines that retraction of the head 130 should be continued (step S406), to finish the shock-sensor-status determination process.

At step S402, when the shock sensor 170 is not detecting a shock (step S402: No), the actuator control unit 210b checks whether the elapsed time since the last detection of the shock by the shock sensor 170 (a shock non-detection time) is shorter than 4 seconds (step S405). While the threshold to be compared with the elapsed time is set to 4 seconds, this threshold can be set to another value.

When the elapsed time is shorter than 4 seconds (step S405: Yes), the actuator control unit 210b determines that retraction of the head 130 should be continued (step S406), to finish the shock-sensor-status determination process.

When the elapsed time is longer than 4 seconds (step S405: No), the actuator control unit 210b determines that the head 130 should be returned (step S407), to finish the shock-sensor-status determination process.

Figure 7:
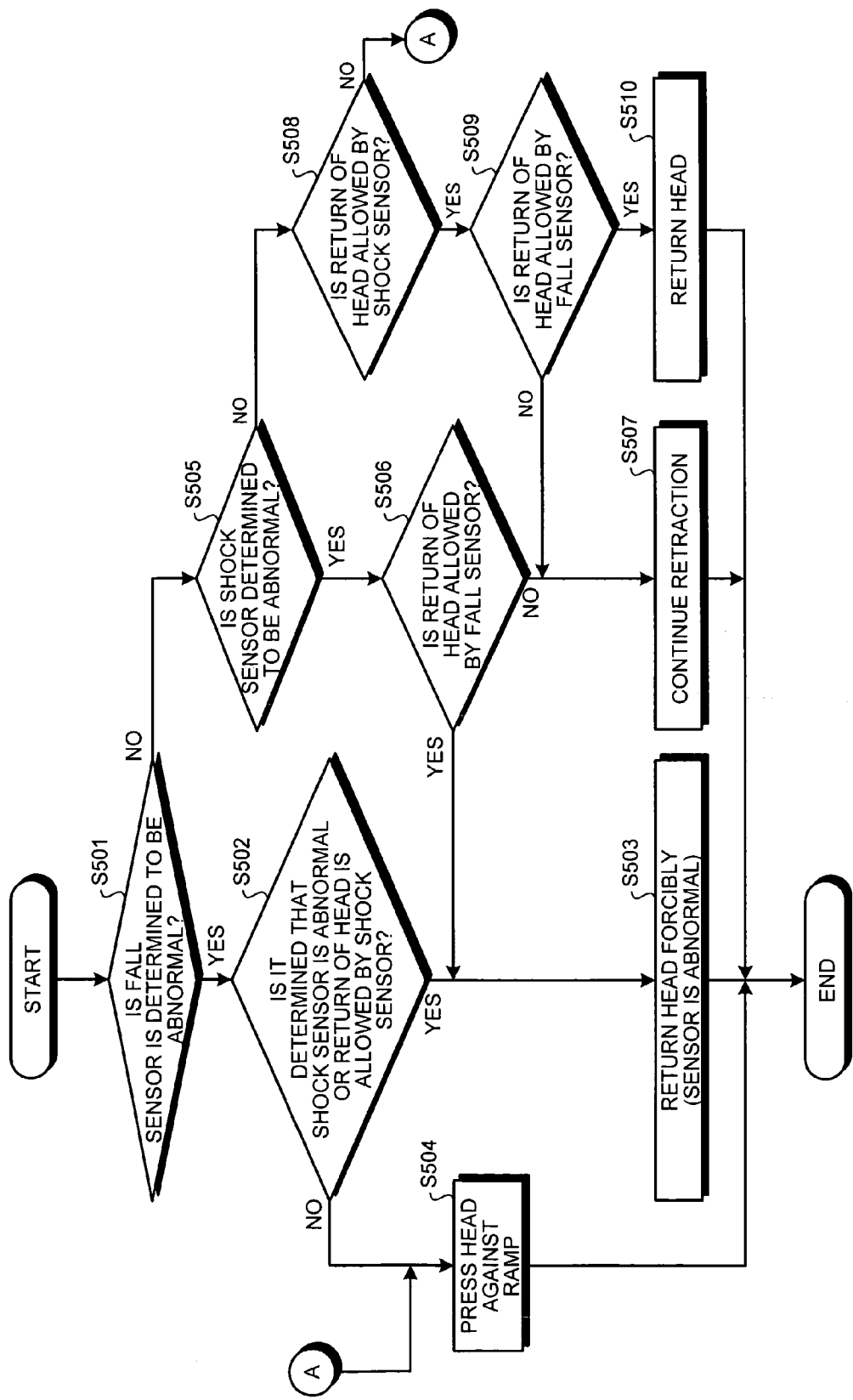
FIG. 7 is a flowchart of a processing procedure for a head control process shown in FIG. 4.

A head control process procedure shown in FIG. 4 is explained in detail. FIG. 7 is a flowchart of a processing procedure for the head control process shown in FIG. 4. As shown in FIG. 7, the actuator control unit 210b in the magnetic disk drive 100 checks whether the fall sensor 190, is determined to be abnormal by the fall-sensor-status determination process shown in FIG. 5 (step S501).

When the fall sensor 190 is determined to be abnormal by the fall-sensor-status determination process (step S501: Yes), the actuator control unit 210b checks whether the shock sensor 170 is determined to be abnormal by the shock-sensor-status determination process shown in FIG. 6, or return of the head 130 is allowed according to the shock-sensor-status determination process (step S502).

When the shock sensor 170 is determined to be abnormal by the shock-sensor-status determination processing unit return of the head 130 is allowed according to the shock-sensor-status determination process (step S502: Yes), the actuator control unit 210b forcibly returns the head 130 (step S503), to finish the head control process, since the fall sensor 190 is determined to be abnormal, and the shock sensor 170 is determined to be abnormal or return of the head 130 is allowed. The output of the sensor determined to be abnormal is ignored hereafter.

When the shock sensor 170 is not determined to be abnormal according to the shock-sensor-status determination process and return of the head 130 is not allowed according to the shock-sensor-status determination process, that is, it is determined to continue the retraction of the head 130 ((step S502: No), the actuator control unit 210b controls the head 130 to be pressed against the ramp 120 to continue the retraction of the head 130 (step S504), to finish the head control process.

At step S501, when the fall sensor 190 is not determined to be abnormal according to the fall-sensor-status determination process (step S501: No), the actuator control unit 210b checks whether the shock sensor 170 is determined to be abnormal according to the shock-sensor-status determination process (step S505).

When the shock sensor 170 is determined to be abnormal according to the shock-sensor-status determination process (step S505: Yes), the actuator control unit 210b checks whether return of the head 130 is allowed according to the fall-sensor-status determination process (step S506).

When return of the head 130 is allowed according to the fall-sensor-status determination process (step S506: Yes), the actuator control unit 210b ignores the output result of the shock sensor 170, since the shock sensor 170 has an abnormal state, though the fall sensor 190 does not have any abnormality, to return the head 130 forcibly (step S503), to finish the head control process.

When return of the head 130 is not allowed according to the fall-sensor-status determination process, that is, it is determined to continue retraction of the head 130 (step S506: No), the actuator control unit 210b continues the retraction of the head 130 (step S507), to finish the head control process. However, in this case, different from the process at step S504, since the clamp current does not flow to the actuator 140, the process to press the head 130 against the ramp 120 is not performed.

At step S505, when the shock sensor 170 is not determined to be abnormal according to the shock-sensor-status determination process (step S505: No), the actuator control unit 210b checks whether it is determined that the head 130 should be returned according to the shock-sensor-status determination process (step S508).

When it is determined that the head 130 should be returned according to the shock-sensor-status determination process (step S508: Yes), the actuator control unit 210b further checks if it is determined that the head 130 should be returned according to the fall-sensor-status determination process (step S509).

When it is determined that the head 130 should be returned according to the fall-sensor-status determination process (step S509: Yes), the actuator control unit 210b returns the head 130 onto the surface of the magnetic disk 110 (step S510), to finish the head control process.

When it is not determined that the head 130 should be returned according to the fall-sensor-status determination process, that is, it is determined to continue the retraction of the head 130 (step S509: No), the actuator control unit 210b continues the retraction of the head 130 (step S507), to finish the head control process.

At step S508, when it is determined that the head 130 should not be returned according to the shock-sensor-status determination process, that is, it is determined to continue the retraction of the head 130 (step S508: No), the actuator control unit 210b controls the head 130 to be pressed against the ramp 120 to continue the retraction of the head 130 (step S504), to finish the head control process.

The summary of the head control process to be performed by the actuator control unit 210b is shown in FIG. 8. FIG. 8 is a table of process contents in the head control process.

That is, when it is determined to continue the retraction of the head according to the shock-sensor-status determination process shown in FIG. 6, a process for pressing the head 130 against the ramp 120 by supplying clamp current to the actuator 140 is executed, regardless of the determination result by the fall-sensor-status determination process shown in FIG. 5. Accordingly, preparation for a shock that can occur later can be made.

Further, when it is determined to continue the retraction of the head according to the fall-sensor-status determination process, even if it is determined that the shock sensor is abnormal or it is determined to allow the return of the head according to the shock-sensor-status determination process, retraction of the head 130 is continued. Thus, by not allowing the return of the head 130 when the fall sensor 190 is detecting a fall, preparation for a shock after the fall can be made.

When it is determined that the shock sensor 170 is abnormal according to the shock-sensor-status determination process, and it is determined that the fall sensor 190 is abnormal or that the return of the head 130 should be allowed according to the fall-sensor-status determination process, the head 130 is forcibly returned.

Likewise, when it is determined that the head 130 should be returned according to the shock-sensor-status determination process, and it is determined that the fall sensor 190 is abnormal according to the fall-sensor-status determination process, the head 130 is forcibly returned. Accordingly, a record reproduction process of the head 130 with respect to the magnetic disk 110 can be resumed quickly.

When it is determined that the head 130 should be returned according to the shock-sensor-status determination process, and it is determined that the head 130 should be returned according to the fall-sensor-status determination process, the return process of the head 130 is executed.

As explained above, in the present embodiment, the time-measurement processing unit 210c in the magnetic disk drive 100 measures the duration of the detection state or non-detection state of an abnormal state such as falling or shock generation, when the head 130 is retracted, and the actuator control unit 210b determines whether the head 130 should be returned based on the measured duration. Accordingly, when the head 130 is retracted, the head 130 can be returned safely.

According to the present embodiment, the time-measurement processing unit 210c measures the duration of a state of detecting no abnormality, and the actuator control unit 210b allows the return of the head 130 when the duration of the state of detecting no abnormality is longer than the predetermined threshold. Accordingly, by returning the head 130 when the state of detecting no abnormality continues sufficiently, the head 130 can be returned safely.

Furthermore, according to the present embodiment, the time-measurement processing unit 210c measures the duration of a state of detecting abnormality, and the actuator control unit 210b allows the return of the head 130 when the duration of the state of detecting abnormality is longer than the predetermined threshold. Accordingly, the record reproduction processing of the data can be resumed quickly, by detecting a failure of the sensor that detects abnormality to return the head 130.

Moreover, according to the present embodiment, the time-measurement processing unit 210c measures the duration of a state of detecting no shock after the shock sensor 170 has detected a shock, and the actuator control unit 210b does not allow the return of the head 130 when the duration of the state of detecting no shock is shorter than the predetermined threshold. Accordingly, preparation for a shock that can occur later can be made by not allowing return of the head 130 when the duration of the state of detecting no shock is not sufficient.

Furthermore, according to the present embodiment, when it is detected that the duration of the state of detecting no shock is shorter than the predetermined threshold and return of the head 130 is not allowed, the actuator control unit 210b controls the head 130 to be pressed against the ramp 120 in a retraction area. Accordingly, by pressing the head 130 against the ramp 120, preparation for a shock that can occur later can be made reliably.

Moreover, according to the present embodiment, the time-measurement processing unit 210c measures the duration of a falling state after the fall sensor 190 has detected falling, and the actuator control unit 210b does not allow return of the head 130 when the duration of the falling state is shorter than the predetermined threshold. Accordingly, when the duration of the state of not detecting a fall is not sufficient, the return of the head 130 is not allowed, thereby preparing for a shock after the fall.

Various types of processing explained in the present embodiment can be realized by executing a program prepared in advance by a processing unit such as a central processing unit (CPU), a micro control unit (MCU), or a micro processing unit (MPU) equipped in the magnetic disk drive (computer).

In the example shown in FIG. 2, various programs for realizing various types of processing described above are stored in the ROM 220, and the control unit 210 reads and executes the various programs recorded in the ROM 220, thereby activating various processes for realizing functions of the various processing units (the data processing unit 210a, the actuator control unit 210b, and the time-measurement processing unit 210c).

The various programs do not need to be stored initially in the ROM. For example, the programs can be stored in "a portable physical medium" such as a flexible disk (FD), a compact disk (CD)-ROM, a magneto-optical (MO) disk, a digital versatile disk (DVD), and an integrated circuit (IC) card inserted into the computer, "a fixed physical medium" such as a hard disk drive (HDD) equipped inside or outside of the computer, or "other computers (or servers)" connected to the computer via a public line, the Internet, a local area network (LAN), or a wide area network (WAN), and the computer reads and executes these programs from such a medium.

While the present embodiments of the present invention have been explained above, variously modified embodiments other than the explained embodiments can be made without departing from the scope of the technical spirit of the appended claims.

Of the respective process explained in the present embodiments, all or a part of the process explained as being performed automatically can be performed manually, or all or a part of the process explained as being performed manually can be performed automatically in a known method.

Information including the process procedures, control procedures, specific names, and various kinds of data and parameters shown in the specification or in the accompanying drawings can be optionally changed, unless otherwise specified.

The respective constituent elements of respective devices shown in the drawings are functionally conceptual, and physically the same configuration is not always necessary. In other words, the specific mode of dispersion and integration of each device is not limited to the shown ones, and all or a part thereof can be functionally or physically dispersed or integrated in an optional unit, according to the various kinds of load and the status of use.

Furthermore, all or an optional part of the respective process functions performed by each device can be realized by the CPU (MCU, MPU) or a program analyzed and executed by the CPU (MCU, MPU), or can be realized as hardware by a wired logic.

As describe above, according to an embodiment of the present invention, when the head is retracted from the surface of the recording medium, the head can be returned safely, a damage of the head and the recording medium caused by returning the head in spite of an abnormal status can be prevented, and the service life of the recording medium can be extended.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A storage device that returns a head, which is retracted from a storage medium with a detection of an abnormality, onto the storage medium, the storage device comprising:

a time measuring unit that measures a duration time of a state relating to the detection of the abnormality when the head is retracted; and a head-return determining unit that determines whether to return the head onto the storage medium based on the measured duration time.

2. The storage device according to claim 1, wherein
the time measuring unit measures a duration time of not detecting the abnormality, and
when the measured duration time of not detecting the abnormality is longer than a predetermined threshold, the head-return determining unit allows a return of the head.

3. The storage device according to claim 1, wherein
the time measuring unit measures a duration time of detecting the abnormality, and
when the measured duration time of detecting the abnormality is longer than a predetermined threshold, the head-return determining unit allows a return of the head.

4. The storage device according to claim 1, wherein
the abnormality includes an occurrence of a shock,
the time measuring unit measures a duration time of not detecting any shock after a shock sensor has detected a shock, and
when the measured duration time of not detecting the shock is shorter than a predetermined threshold, the head-return determining unit does not allow a return of the head.

5. The storage device according to claim 4, wherein
when the head-return determining unit does not allow the return of the head, the head-return determining unit controls the head in such a manner that the head is pressed against a stopper that is located at a retraction area.

6. The storage device according to claim 1, wherein the abnormality includes a falling of the storage device,
the time measuring unit measures a duration time of the falling of the
storage device after a fall sensor has detected the falling of the storage device, and
when the measured duration time of the falling state is shorter than a predetermined threshold, the head-return determining unit does not allow a return of the head.

7. A method of returning a head, which is retracted from a storage medium with a detection of an abnormality, onto the storage medium, the method comprising:
measuring a duration time of a state relating to the detection of the abnormality when the head is retracted; and
determining whether to return the head onto the storage medium based on the measured duration time.

8. The method according to claim 7, wherein
the measuring includes measuring a duration time of not detecting the abnormality, and
when the measured duration time of not detecting the abnormality is longer than a predetermined threshold, the determining includes allowing a return of the head.

9. The method according to claim 7, wherein
the measuring includes measuring a duration time of detecting the abnormality, and
when the measured duration time of detecting the abnormality is longer than a predetermined threshold, the determining includes allowing a return of the head.

10. The method according to claim 7, wherein
the abnormality includes an occurrence of a shock,
the measuring includes measuring a duration time of not detecting any shock after a shock sensor has detected a shock, and
when the measured duration time of not detecting the shock is shorter than a predetermined threshold, the determining includes not allowing a return of the head.

11. The method according to claim 10, wherein
when the return of the head is not allowed, the determining includes controlling the head in such a manner that the head is pressed against a stopper that is located at a retraction area.

12. The method according to claim 7, wherein
the abnormality includes a falling of the storage device,
the measuring includes measuring a duration time of the falling of the storage device after a fall sensor has detected the falling of the storage device, and
when the measured duration time of the falling state is shorter than a predetermined threshold, the determining includes not allowing a return of the head.

13. A computer program product comprising a computer usable medium having computer readable program codes embodied in the medium that when executed cause a computer to execute:
measuring a duration time of a state relating to the detection of the abnormality when the head is retracted; and
determining whether to return the head onto the storage medium based on the measured duration time.

14. An apparatus for returning a head, which is retracted from a storage medium with a detection of an abnormality, onto the storage medium, the apparatus comprising:
a time measuring unit that measures a duration time of a state relating to the detection of the abnormality when the head is retracted; and
a head-return determining unit that determines whether to return the head onto the storage medium based on the measured duration time.

15. The apparatus according to claim 14, wherein
the time measuring unit measures a duration time of not detecting the abnormality, and
when the measured duration time of not detecting the abnormality is longer than a predetermined threshold, the head-return determining unit allows a return of the head.

16. The apparatus according to claim 14, wherein
the time measuring unit measures a duration time of detecting the abnormality, and
when the measured duration time of detecting the abnormality is longer than a predetermined threshold, the head-return determining unit allows a return of the head.

17. The apparatus according to claim 14, wherein
the abnormality includes an occurrence of a shock,
the time measuring unit measures a duration time of not detecting any shock after a shock sensor has detected a shock, and
when the measured duration time of not detecting the shock is shorter than a predetermined threshold, the head-return determining unit does not allow a return of the head.

18. The apparatus according to claim 17, wherein
when the head-return determining unit does not allow the return of the head, the head-return determining unit controls the head in such a manner that the head is pressed against a stopper that is located at a retraction area.

19. The apparatus according to claim 14, wherein
the abnormality includes a falling of the storage device,
the time measuring unit measures a duration time of the falling of the storage device after a fall sensor has detected the falling of the storage device, and
when the measured duration time of the falling state is shorter than a predetermined threshold, the head-return determining unit does not allow a return of the head.

* * * * *